US006216194B1

United States Patent
Aoyama et al.

(10) Patent No.: US 6,216,194 B1
(45) Date of Patent: Apr. 10, 2001

(54) INFORMATION PROCESSING UNIT FOR SEPARATELY CONTROLLING A PLURALITY OF SHARED BUSES

(75) Inventors: Takaharu Aoyama, Atsugi; Toshimi Sugita, Hadano; Tsuyoshi Katoh, Ebina; Hirokatsu Shioda, Ebina; Kazuo Sugai, Ebina; Nobuhito Matsuyama, Hadano, all of (JP)

(73) Assignees: Hitachi, Ltd., Tokyo; Hitachi Information Technology Co., Ltd., Kanagawa-ken, both of (JP)

( * ) Notice: Subject to any disclaimer, the term of this patent is extended or adjusted under 35 U.S.C. 154(b) by 0 days.

(21) Appl. No.: 09/210,482

(22) Filed: Dec. 14, 1998

(30) Foreign Application Priority Data

Dec. 16, 1997 (JP) .................................................. 9-346174

(51) Int. Cl.[7] .................................................. G06F 13/00
(52) U.S. Cl. .................................................. 710/129
(58) Field of Search .................................... 710/129, 128, 710/101, 102

(56) References Cited

U.S. PATENT DOCUMENTS 5,495,583 * 2/1996 Townsend et al. .................... 710/102
5,572,688 * 11/1996 Sytwu .................................... 710/129
5,740,378 * 4/1998 Rehl et al. ............................ 710/103
5,768,612 * 6/1998 Nelson .................................. 712/32
5,812,801 * 9/1998 Saperstein et al. .................. 710/128

FOREIGN PATENT DOCUMENTS

| 5-204822 | 8/1993 | (JP) . |
| 7-141285 | 6/1995 | (JP) . |
| 7-210498 | 8/1995 | (JP) . |
| 9-198307 | 7/1997 | (JP) . |

* cited by examiner

Primary Examiner—David A. Wiley
(74) Attorney, Agent, or Firm—Mattingly, Stanger & Malur, P.C.

(57) ABSTRACT

An information processing unit having a bus controller connected to a plurality of different shared buses which can independently control the different shared buses, and a double adaptor connected to the different shared buses which can independently control the different shared buses, wherein first and second ones of the shared buses are independently controlled to send data from the bus controller to the double adaptor, and from the double adaptor to the bus controller, respectively.

3 Claims, 4 Drawing Sheets

INFORMATION PROCESSING UNIT FOR SEPARATELY CONTROLLING A PLURALITY OF SHARED BUSES

BACKGROUND OF THE INVENTION

The present invention relates to an information processing unit having a plurality of shared buses and an adaptor (optional board) connected to the shared buses, and particularly to an information processing unit that prevents the shared buses from falling into bottleneck when data is transferred through the buses, thereby enabling the data transfer to be efficiently conducted.

A known example of the efficient data transmission is disclosed in JP-A-7-141285. In this example, a plurality of adaptors are connected to two shared buses, and select an unused bus in order for data to be transferred through the bus. In the reference JP-A-7-141285, when one of a plurality of adaptors that use two shared buses at a time requests for data transfer, the other ones wait for at least one of the two shared buses to become unused.

Another example is disclosed in JP-A-5-204822. In this example, a processor is used to control two shared buses independently, thereby enabling its read cycle and write cycle operations to be made in parallel, that is, data can be efficiently transferred through the shared buses. In this technique, a plurality of modules to be controlled by the processor are connected to the shared buses, and operated to read or write, transferring data to each other. However, the same module does not make read and write operations at a time.

In addition, efficient data transfer can be made by use of fast clock or by expanding data bus. As this bus controlling method, there are known, for example, a bus mediation circuit disclosed in JP-A-7-210498, and a cache coherence control method using an information processing unit described in JP-A-9-198307.

In these conventional method, however, when fast clock is used, the pattern design and electromagnetic wave leaking countermeasure need high-order skill because of high frequency, and are thus troublesome to make. Even when the width of data to be transferred is expanded, data on the shared bus is transferred in one direction during a certain period of time, that is, data cannot be transferred in both directions at a time.

SUMMARY OF THE INVENTION

It is an object of the invention to provide an information processing unit capable of transferring data in both directions at a time without use of fast clock.

According to the invention, there is provided an information processing unit having a bus controller and at least one adaptor that can control two or more separated shared buses to which a plurality of adaptors can be connected, wherein when the adaptor connected to one shared bus is needed to transfer more data than the capability of the shared bus, the bus controller and adaptor are provided with functions capable of separately controlling the first and second shared buses at a time in order to improve the performance of the shared bus.

The bus controller is notified by an upper MPU about whether or not the same adaptor is connected to both separated shared buses.

The adaptor and the bus controller, when controlling one of the separated shared buses, make it serve as an up bus exclusive for sending data from the adaptor to bus controller. When controlling the other bus, they make it serve as a down bus exclusive for sending data from the bus controller to adaptor.

In this case, the adaptor and the bus controller control the separated shared buses to serve as up data bus and down data bus on the basis of the numbers attached to the separated shared buses.

Since the adaptor is thus arranged to connect to two or more shared buses, the data transfer capability of the information processing unit can be improved.

According to the invention, two or more separated shared buses can be controlled independently by the bus controller and adaptor in the information processing unit that has a plurality of adaptors connected to the shared buses as described above. When data is transferred between the bus controller and the adaptor, the adaptor controls separately one shared bus for sending data to the bus controller, and the other different bus for accepting data from the bus controller, while the bus controller and adaptor use the two different shared buses at a time. Therefore, data transfer between the adaptor and bus controller can be made in both directions at a time without use of fast clock.

DESCRIPTION OF THE PREFERRED EMBODIMENTS

An embodiment of the invention will be described with reference to the accompanying drawings.

Figure 1:
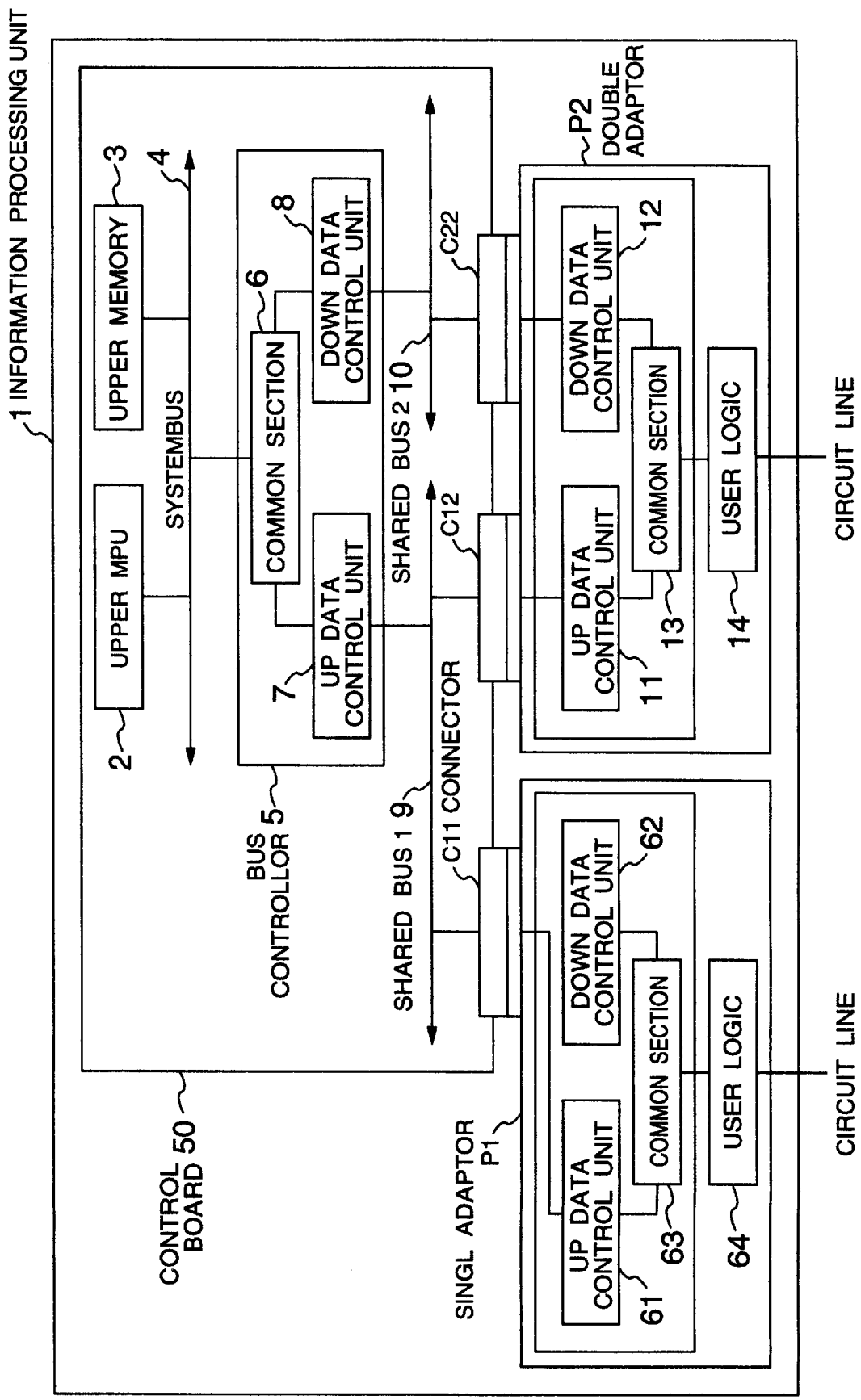
FIG. 1 is a block diagram of the whole construction of an information processing unit showing one embodiment of the invention.

FIG. 1 is a block diagram of the whole construction of an information processing unit 1 showing one embodiment of the invention.

Referring to FIG. 1, one channel line led into the information processing unit 1 is, for example, telephone lines, and the other channel line is a circuit line of, for example, a network in the office. Each adaptor P1–Pn is a logic circuit for each user. When data is received through a certain circuit line, this fact is transmitted to an upper MPU 2. The upper MPU 2 issues the instruction of which adaptor the received data is to be transferred to. The upper MPU 2 is a generally controlling unit of the information processing unit 1. The information processing unit 1 has a bus controller 5 capable of controlling two or more separated shared buses 9, 10, and a plurality of adaptors (optional boards) P1, P2. The shared buses 9, 10 are connected through connectors C11, C12, C22 to the adaptors P1, P2.

The upper MPU 2, bus controller 5, shared buses 9, 10 and connectors C11, C12, C22 are provided on one control board 50. The single adaptor P1 and double adaptor P2 are inserted into these connectors.

The upper MPU 2 discriminates between the adaptors connected to the shared buses 9, 10, or discriminates the single adaptor having one connector from the double adaptor having two connectors. In this case, the upper MPU first makes access to each adaptor through a system bus 4, bus controller 5 and shared bus 9 or 10, and reads out the ID that is present within a common section 63, 13 of the adaptor P1, P2.

Figures 5, 6:
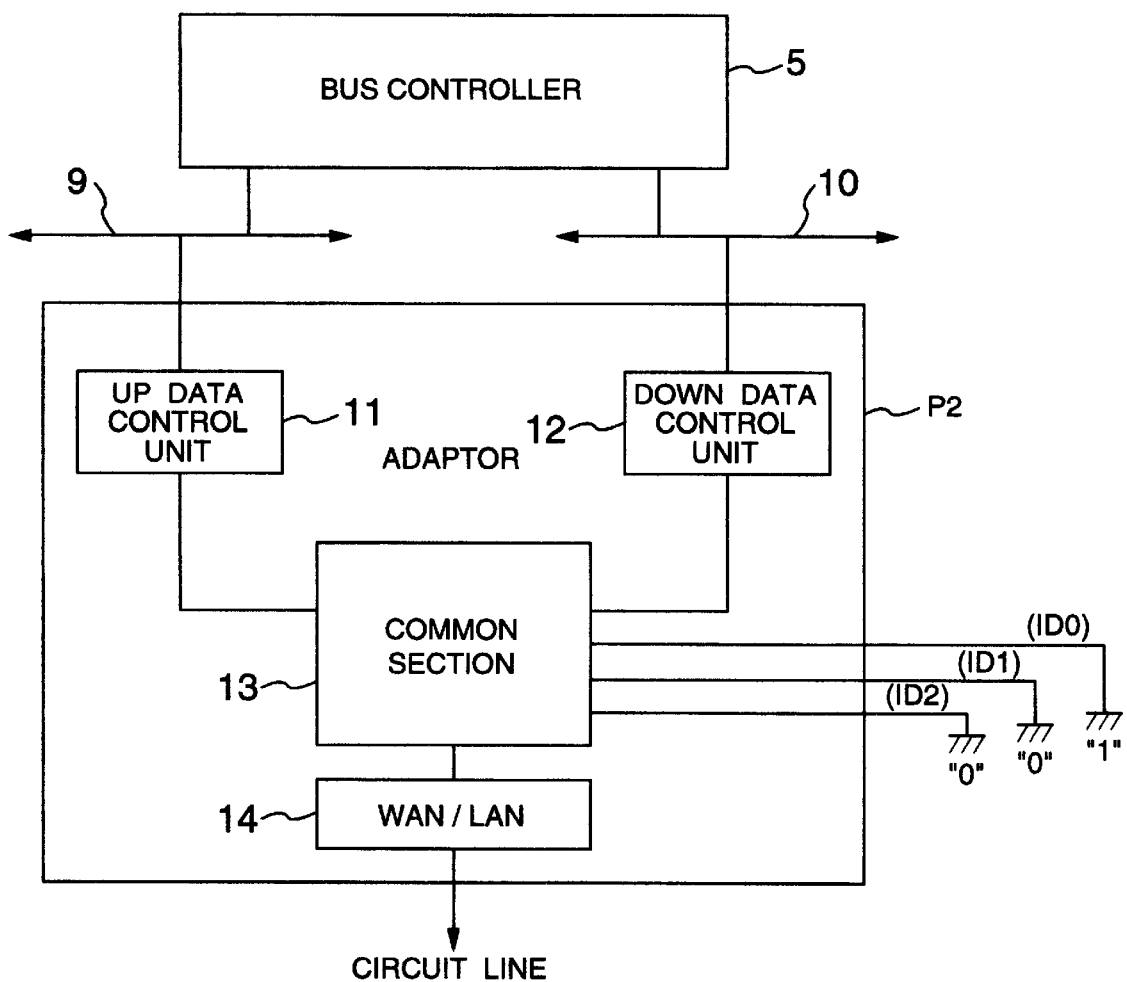
FIG. 5 is a diagram useful for explaining the method of discriminating the IDs of the adaptors and the kinds of channels by the upper MPU.
FIG. 6 is a table for the discrimination of the IDs of the adaptors and the kinds of channels.

FIG. 5 is a diagram showing one example of the discrimination between the adaptor's IDs in FIG. 1. FIG. 6 shows an example of the table for the discrimination between the adaptor's IDs and between the kinds of circuit lines by the upper MPU.

The upper MPU 2 makes access to the common section 13 of the adaptor P2, to which three lines (ID0, ID1, ID2) are connected. The ends of these lines are connected to +5 V for "1" or grounded for "0". That is, three values constitute an identification code. This identification code is able to indicate 8 different IDs, kinds of circuit lines and single or double type of adaptors. The table shown in FIG. 6 is stored in the upper MPU 2.

When the identification code is, for example, "000", as shown in FIG. 6, the adaptor is the single connector type of adaptor 1, and the kind of circuit line is the Ethernet. When the identification code is, for example, "100", the adaptor is the double connector type of adaptor P2, and the kind of circuit line is the Ethernet.

The user logic 14, 64 depends on the kind of circuit line, for example, WAN, LAN, and Ethernet, and provides a logic for communication procedure such as protocol.

When the upper MPU 2 decides that the adaptor is single or double, the decision result is transmitted to the bus controller 5. The adaptor P2 connected to the bus controller 5 and shared buses 9, 10 recognizes that the adaptor type is single or double. Here, it recognizes that the type is double. In addition, each of the shared buses 9, 10 has a different number. When the double adaptor is connected to the two shared buses 9, 10, the double adaptor P2 transfers data to the bus controller through the shared bus 9 of small number (number 1) (up data transfer), and the bus controller 5 transfers data to the double adaptor P2 through the shared bus 10 of large number (number 2) (down data transfer). The up data control unit 7 and down data control unit 8 within the bus controller 5, and the up data control unit 11 and down data control unit 12 within the double adaptor P2 independently operate to transfer data in both directions at a time, thus enabling the shared buses to transfer data at high speed.

The single adaptor P1 and double adaptor P2 have up data control units 61, 11, down data control units 62, 12, common sections 63, 13, and user logics 64, 14, respectively.

Figure 2:
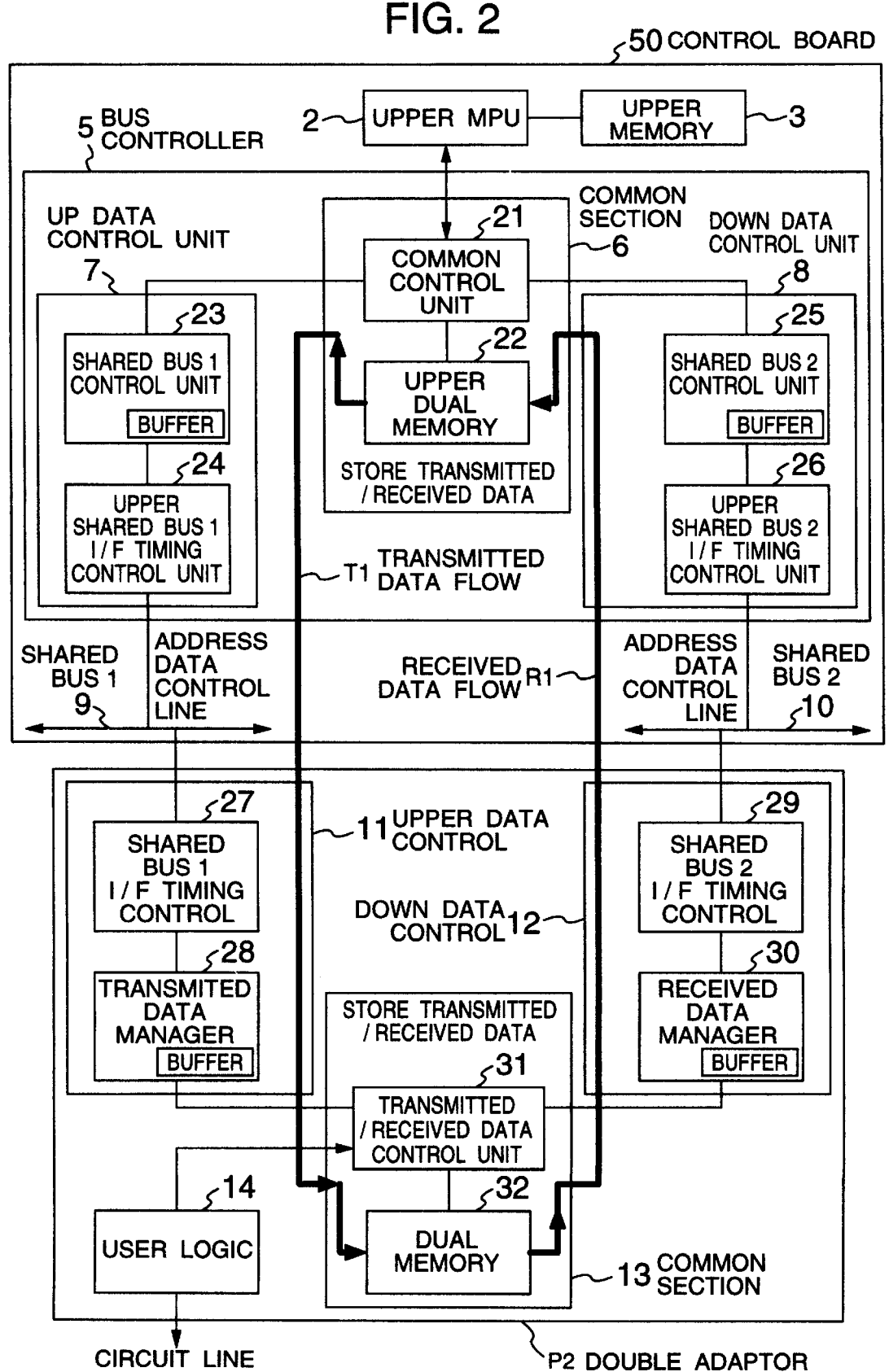
FIG. 2 is a detailed diagram useful for explaining the flow of transmitted data and received data in FIG. 1.

FIG. 2 is a detailed diagram showing the flow of the data received from the circuit line which the adaptor P2 transfers to the bus controller 5, and the data to be transmitted which the bus controller transfers to the adaptor P2.

The flow of the transfer of the received data will be first described with reference to FIG. 2.

The received data from the circuit line is supplied through the user logic 14 to the common section 13 within which the received data is fed through a transmitted/received data control unit 31 to a dual memory 32, stored in the memory. The transmitted/received data control unit 31 notifies a received data manager 30 within the down data control unit 12 of the fact that the received data has been stored. The manager 30 is previously notified of the address at which the received data is to be stored in an upper dual memory 22. Thus, as indicated by a received data flow R1, the manager 30 transfers the received data through the shared bus 10 to that address of the upper dual memory 22 of the common section 6 within the bus controller 5 under the control of a shared bus 2 control unit 25. The shared bus 2 interface timing control unit 29 within the adaptor P2, and the upper shared bus 2 interface timing control unit 26 within the bus controller 5 transfer the received data according to the definite bus timing of the shared bus 10.

The flow of the transfer of the data to be transmitted will be described with reference to FIG. 2.

The upper MPU 2 causes the upper dual memory 22 within the bus controller 5 to store the data being transmitted. At this time, it notifies a common control unit 21 of the address at which the data is stored. The common control unit 21 notifies a shared bus 1 control unit 23 of the fact that the data being transmitted has been stored. The shared bus 1 control unit 23 sends a request for transmission to a transmitted data manager 28 within the adaptor P2. The manager 28 receives from the common control unit 21 the address of data being transmitted. As indicated by a transmitted data flow T1, the data being transmitted is transferred from the upper dual memory 22 through the shared bus 1 control unit 23, shared bus 9, and transmitted/received data control unit 31 to the dual memory 32. The address at which the data being transmitted is transferred to the dual memory 32 is managed by the transmitted data manager 28.

The shared bus 1 interface timing control unit 27 within the adaptor P2 and the upper shared bus 1 interface timing control unit 24 within the bus controller 5 make the transfer of data being transmitted according to the certain bus timing of the shared bus 9.

The shared buses 9 and 10 are of exactly the same specification, and thus the double-type connector and single-type connector can be inserted into the same bus connector.

These buses are physically separated, and only managed by number.

Let it be considered that the received data transfer as indicated by the received data flow R1 occurs together with the transmitted data transfer based on the request for data transmission from the upper MPU 2 as indicated by the transmitted data flow T1.

(1) When the simultaneous occurrence of both flows is seen from the received data flow side:

The transmitted/received data control unit 31 notifies the received data manager 30 of the fact that the received data has been stored in the dual memory 32. The received data manager 30 sends to the transmitted/received data control unit 31 a request for access to the dual memory 32 in order for the stored received data to be stored in the buffer of the manager 30. When the access is permitted, the manager 30 causes the received data stored in the dual memory 32 to be stored in the buffer of the manager 30, and then sends a request for transfer of received data to the shared bus 2 control unit 25. The received data is held in the buffer until the permission for data transfer can be obtained. When the request is permitted, the received data is transferred to the buffer of the shared bus 2 control unit 25 through another shared bus 10 that operates independently of the shared bus 9 that is used for transfer of data being transmitted. After the transfer of the received data, the manager 30 becomes in a state in which the next received data can be transferred.

When data is held in the buffer of manager 30, the manager 30 cannot receive the next data from the dual memory 32. Thus, during this interval the access to the dual memory 32 can be made by the transmitted data transfer or data transfer from circuit line.

The shared bus 2 control unit 25 sends to the common control unit 21 a request of transferring the received data to the upper dual memory 22 and writing therein. The common control unit 21, if the upper dual memory 22 is not used, accepts the request from the control unit 25, and notifies the control unit 25 of the fact. The control unit 25 causes the received data held in its buffer to be written in the upper dual memory 22, so that the control unit 25 is brought into the state in which the next received data can be accepted.

(2) When it is seen from the transmitted data flow side:

The common control 21 notifies the shared bus 1 control unit 23 of the fact that the data being transmitted is stored in the upper dual memory 22. The shared bus 1 control unit 23 sends to the common control unit 21 a request for the access to the upper dual memory 22 in order that the data stored in the upper dual memory 22 can be transferred to the buffer of the control unit 23. When the access is permitted, the control unit 23 causes the data being transmitted to be stored in the buffer of the control unit 23, and then sends to the transmitted data manager 28 a request for transfer of data. The data being transmitted is held within the buffer until the permission can be obtained. When the transfer of data is permitted, the data is transferred to the buffer of the manager 28 through another shared bus 9 that operates independently of the shared bus 10 that is used for the transfer of received data. After the transfer, the shared bus control unit 23 becomes in a state in which the next data to be transmitted can be transferred.

The shared bus 1 control unit 23, when data is present within the buffer of the control unit 23, cannot cause the next data to be transferred from the upper dual memory 22 and stored therein. Thus, during this interval of time, the received data can be transferred or the upper MPU can make access to the upper dual memory 22 by transfer of data.

The manager 28 sends to the transmitted/received data control unit 31 a request for transfer to the dual memory 32 and writing of data to be transmitted. The control unit 31, if the dual memory 32 is not used, or free, notifies the control unit 28 of the fact that the request can be accepted. The control unit 28 causes the data stored in its buffer to be written in the dual memory 32, and it is ready to accept the next data being transmitted.

As described above, one double adaptor P2 and the bus controller 5 are both connected to the two shared buses 9 and 10, and control the buses independently, thereby achieving fast transfer of data.

Here, each of the shared bus 1 control unit 23, shared bus 2 control unit 25, transmitted data manager 28 and received data manager 30 has a buffer because only either one of the data reading and writing paths is provided in the upper dual memory 2 and dual memory 32. If each of the upper dual memory 22 and dual memory 32 has a plurality of paths for reading and writing of data so that data can be read and written at a time, no buffer is needed to provide in the control units 23, 25, and managers 28, 30. The data transfer permission can be directly transmitted and received between the control units 21 and 31, and the data being transmitted and the received data can be separately transferred between the upper dual memory 22 and dual memory 32.

In addition, the number of shared buses is not limited to two, but may be three or above. Even if three or more shared buses are used, the paths for up data and down data in the adaptor are constructed to use separate shared buses, respectively. The control method is the same as in the above embodiment.

Figure 3:
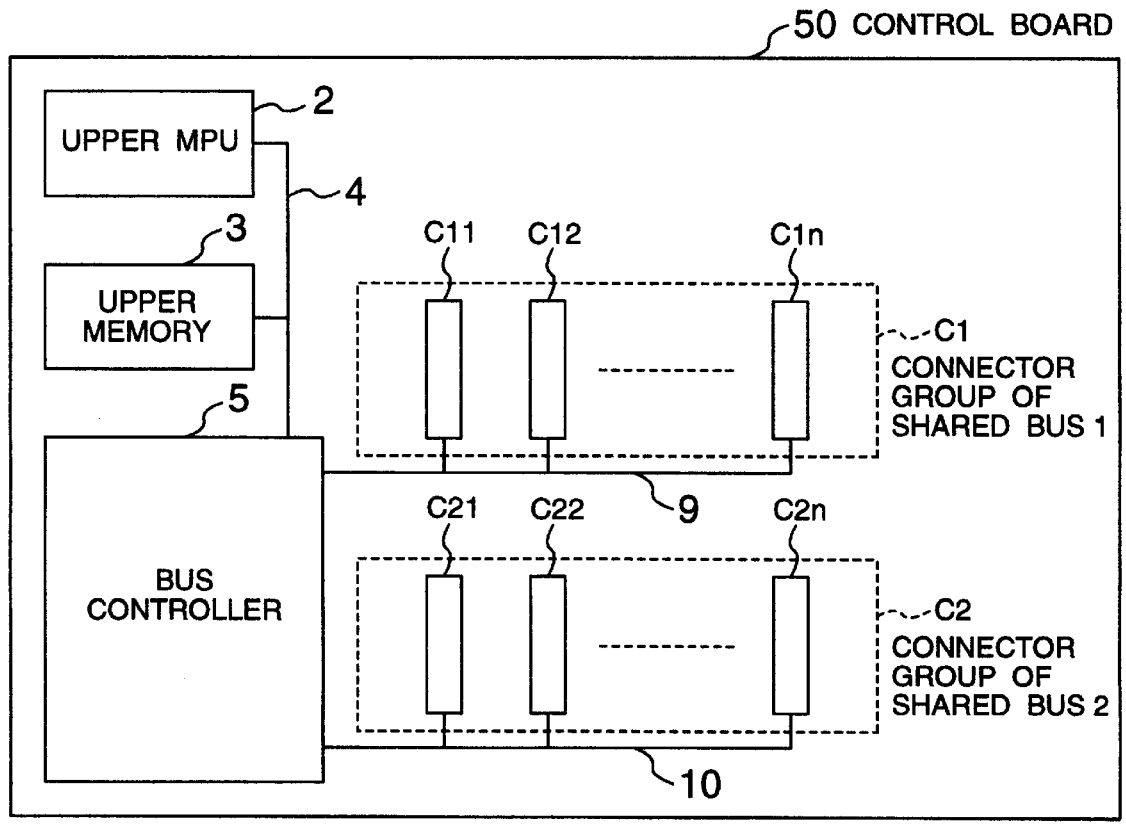
FIG. 3 is a diagram useful for explaining the structure of connectors and shared buses according to the invention.

FIG. 3 shows the arrangement of the connectors and shared buses according to the invention. These connectors and shared buses are provided on the control board 50.

As shown in FIG. 3, the upper block indicated by a broken line includes a connector group C1 (C11, C12, C1n) connected to the shared bus 9, and the lower block indicated by a broken line includes a connector group C2 (C21, C22, C2n) connected to the shared bus 10.

When a plurality of connectors are connected to each shared bus 9, 10, the single adaptor has one of the connectors, and the double adaptor has two connectors, one for the bus 9, the other for the bus 10. The double adaptor may use a combination of C11 and C21 or another combination of C12 and C22, namely, a combination of C1n and C2n.

For example, the single adaptor P1 has one connector C11, and the double adaptor P2 has two connectors C12 and C22. The single adaptor P1 can be connected to any one of the connectors (C11, C12, C1n) connected to the shared bus 9 and connectors (C21, C22, C2n) connected to he shared bus 10. The double adaptor P2 are connected to both buses through two connectors; for example, C11 of shared bus 9 and C21 of shared bus 10, C12 of shared bus 9 and C22 of shared bus 10 or C1n of shared bus 9 and C2n of shared bus 10.

Figure 4:
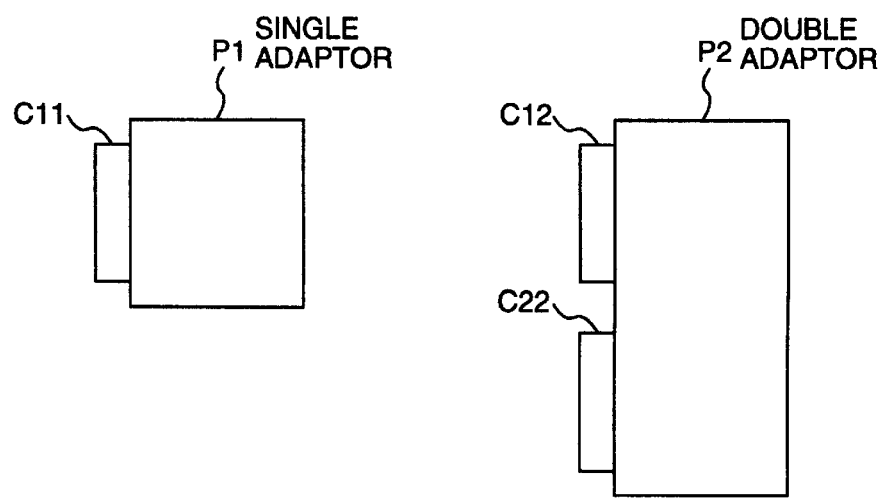
FIG. 4 is a diagram showing an example of the combination of the adaptors and connectors according to the invention.

FIG. 4 shows the arrangement of the adaptors and connectors according to the invention.

As illustrated in FIG. 4, the single adaptor P1 is connected to the connector 11, and the double connector P2 is connected to the two connectors (C12 and C22).

In the information processing unit 1, the single adaptor P1 and double adaptor P2 are provided so that the double adaptor P2 can make simultaneous bi-directional transfer of data according to the invention and that the single adaptor. P1 can make bi-directional transfer of data though the operations of data transfer in both directions are not made at the same time.

If the double adaptor P2 is connected both to the connector C12 of shared bus 9 and to the connector C22 of shared bus 10, the single adaptor P1 can be connected to the connector C11 of shared bus 9 or the connector C21 of shared bus 10.

The data transfer by the single adaptor P1 connected to the connector C11 of shared bus 9 is made in the same way as by the double adaptor P2 as shown in FIG. 1. The up control unit 7 of the bus controller 5 is previously notified by the upper MPU 2 of the fact that the single adaptor P1 is connected to the connector C11. When the single adaptor P1 makes up-data transfer, the up control unit 7 functions as an up control unit. When the single adaptor P1 makes down-data transfer, the up control unit 7 functions as a down control unit. The up control unit 61 and down control unit 62 of the single adaptor P1 are exclusively controlled by the common section 63.

The connector C11 of single adaptor P1 and the connector C12 of double adaptor P2 are connected to the shared bus 9. The single adaptor P1 can make up-data transfer and down-data transfer in separate intervals of time through the shared bus 9. The double adaptor P2 can make up-data transfer. The shared bus 9 can be shared by the single adaptor P1 and double adaptor P2 in a time sharing manner.

The present invention is not limited to the disclosed embodiment, but various different modifications can be made without departing from the scope of the invention.

What is claimed is:

1. An information processing unit comprising:
   an upper MPU;
   a plurality of shared buses including at least first and second shared buses;
   a plurality of interfaces connected to said plurality of shared buses;
   a bus controller connected to said upper MPU and at least said first and second different shared buses, said bus controller being capable of independently controlling said different shared buses; and at least one double adaptor connected to a circuit line and at least said first and second shared buses, said double adaptor being capable of independently controlling said different shared buses, wherein said first shared bus is used as a down bus exclusive for sending data from said bus controller to said double adaptor, and said second shared bus is used as an up bus exclusive for sending data from said double adaptor to said bus controller.

2. An information processing unit according to claim 1, wherein said bus controller includes a first buffer for temporarily storing data being transmitted, a second buffer for temporarily storing received data, and first memory means for storing said transmitted data and said received data, said double adaptor includes a third buffer for temporarily storing said transmitted data, a fourth buffer for temporarily storing said received data, and second memory means for storing said transmitted data and said received data, and said transmitted data is independently transferred from said first buffer to said third buffer through said first shared bus, while said received data is independently transferred from said fourth buffer to said second buffer through said second shared bus.

3. An information processing unit according to claim 1, wherein said bus controller includes a plurality of connectors to which said adaptors can be connected, and said connectors are connected to said plurality of shared buses and being adaptive to both single adaptor and double adaptor.

* * * * *